July 21, 1964    R. L. CAMPBELL ETAL    3,141,477
FLUID FLOW CONTROL MEANS
Filed July 19, 1961

INVENTORS
RICHARD L. CAMPBELL
THOMAS E. NOAKES
By Andrew K. Foulds
their ATTORNEY ated July 21, 1964

3,141,477
FLUID FLOW CONTROL MEANS
Richard L. Campbell, Birmingham, and Thomas E. Noakes, Detroit, Mich., assignors to American Radiator & Standard Sanitary Corporation, New York, N.Y., a corporation of Delaware
Filed July 19, 1961, Ser. No. 125,180
3 Claims. (Cl. 138—45)

This invention relates to devices for maintaining a relatively constant volumetric delivery through a fluid flow passage in the presence of substantial variation of pressure in the fluid supplied thereto. The invention is applicable in many fields, as for example in fluid systems for supplying water to domestic washing machines, in domestic shower heads, and in various dispensers for liquids such as soft drinks, coffee and the like.

One object of the present invention is to provide a flow control device which is of simple low cost construction and which at the same time serves to maintain a relatively constant volumetric delivery over a relatively wide range of supply pressures.

A particular object of the invention is to provide a constant rate of flow device which begins to operate at a relatively low threshold pressure and which continues to operate satisfactorily at relatively high pressures.

A further object of the invention is to provide a constant rate of flow device which can be manufactured as a relatively low cost item without necessity for holding close tolerances on a plurality of separate cooperating parts.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
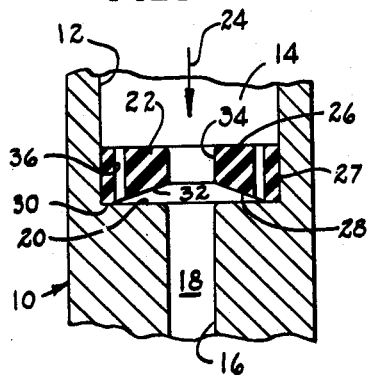
FIGURE 1 is a sectional view taken through one embodiment of the invention showing same in an unstressed or zero fluid pressure condition.

Referring more particularly to the drawings, especially FIG. 1, there is shown therein a constant rate of flow device comprising a fluid conduit means 10 configured to include an axially extending annular surface 12 for defining a relatively large diameter inlet chamber 14, an annular axially extending interior side surface 16 of relatively small diameter for defining an outlet chamber 18, and a generally radially extending shoulder 20 extending between the two interior side surfaces 12 and 16 to define a seat for a resilient rubber-like control member 22. The direction of fluid flow through the device is denoted by arrow 24.

Figure 2:
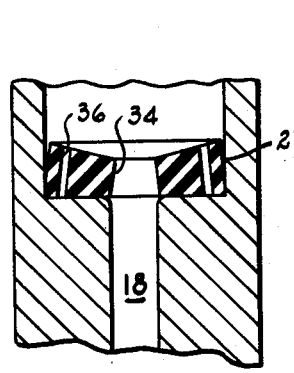
FIG. 2 is a sectional view of the FIG. 1 embodiment showing same when subjected to an intermediate fluid pressure.
Figure 3:
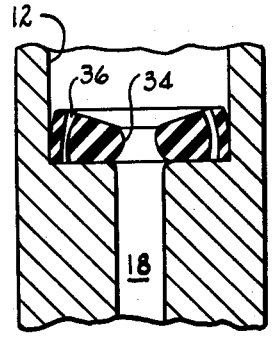
FIG. 3 is a sectional view of the FIG. 1 embodiment showing same when subjected to a relatively high fluid pressure.

Resilient rubber-like flow control member 22 is provided with an upstream face 26, a side surface 27, and a downstream face 28, the entire outer annular peripheral portion 30 of which is arranged to sealingly engage the radially outermost surface area of shoulder 20. In order to render the flow control member responsive to variations in fluid pressure, portion 32 of downstream face 28 is made concave, preferably frustro-conical as shown in FIG. 1, and a relatively large primary flow control opening or aperture 34 is extended between the upstream and downstream faces of the flow control member. The diameter of flow aperture 34 is made slightly smaller than the diameter of outlet chamber 18 so that when the chamber 14 pressure is relatively low, as for example twenty p.s.i., the resilient member wall area immediately surrounding flow aperture 34 is effective to throttle the flow and thereby allow less flow through aperture 34 than would otherwise flow through chamber 18 if flow control member 22 were not present. At pressures above about twenty p.s.i. the flow control member deflects as shown in FIG. 2 to progressively restrict the size of aperture 34. At the highest operational pressure range the resilient flow control member is believed to undergo axial compression as shown in FIG. 3, with consequent further reduction in the size of flow aperture 34. The general arrangement is such as to provide a relatively constant volumetric delivery through aperture 34 irrespective of variations in fluid supply pressure.

The construction thus far described is generally conventional, and the improvement of the present invention deals particularly with the provision of certain auxiliary flow apertures designated by numeral 36 in the illustrative drawing. As will be seen from FIG. 1, in the unstressed condition of flow control member 22 apertures 36 extend generally axially and provide an auxiliary flow path for fluid flowing from the inlet chamber 14 to the outlet chamber 18. In a relatively low pressure range, as for example fifteen p.s.i., flow through chamber 16 is the sum of the flows through apertures 34 and 26. As the fluid pressure increases in this pressure range the resilient member wall area surrounding aperture 34 deflects from the FIG. 1 position toward the FIG. 2 position so that the size of the flow aperture 34 is decreased. The total flow area through member 22 is further decreased by the fact that downstream face portion 32 moves toward shoulder 20 to thereby restrict or close the auxiliary flow apertures 36.

The use of auxiliary flow apertures 36 has the desired feature of making the flow annulus start to operate at a relatively low pressure without sacrifice in the flow control action in the higher pressure range. Thus, aperture 34 can be made sufficiently small to control in the high pressure range without its having an undue restricting effect in the low pressure range.

Figure 7:
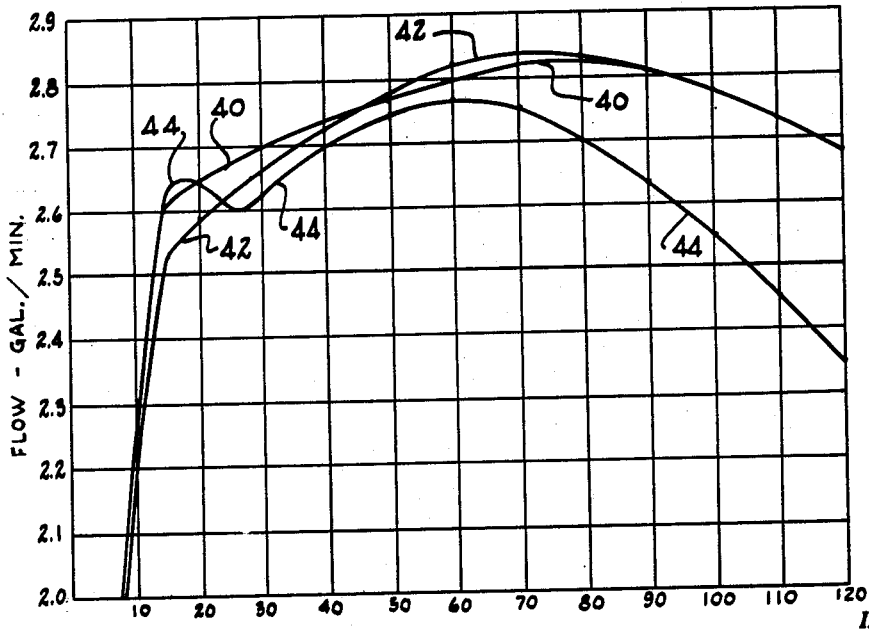
FIG. 7 is a graph comparing the performance of the structures of the invention with prior art structures.

The performance curve of a flow control device constructed as shown in FIG. 1, and rated at 2.6 gallons per minute, is denoted in FIG. 7 by numeral 40. It will be seen that the curve 40 device fully reaches its rated flow at about fifteen p.s.i. and thereafter maintains a flow within a ten percent deviation range up to a pressure of one hundred twenty p.s.i. Curve 40 is relatively flat with no abrupt fluctuations from about fifteen p.s.i. to one hundred twenty p.s.i.

The performance of a flow control device similar to the FIG. 1 device except that apertures 36 are omitted is denoted by numeral 42, and it will be noted that such device does not fully reach its rated flow until the pressure is about twenty-two p.s.i. Additionally, the prior art device has a slightly greater deviation from rated flow in the pressure range above twenty-two p.s.i.

There is also shown in FIG. 7 the performance curve 44 for a device constructed as shown in Patent 2,936,790. It will be seen that the operation thereof is somewhat erratic in the pressure range between twenty p.s.i. and thirty-five p.s.i., although still within a ten percent deviation range. In the relatively high pressure range the volumetric delivery of this device falls off considerably which is a further disadvantage.

Generally speaking, the device of the present invention is believed to possess superior over-all operating characteristics to those of the various prior art devices since it more nearly clings to the rated volumetric delivery in a wide range of pressures, with less abrupt changes in flow, with less straying from the desired flow values, and with a fairly low threshold pressure.

Referring to FIGS. 1 and 2, it will be noted that closing of flow apertures 36 is accomplished by hinge-like deflection of the flow member, whereas closing of the corresponding flow walls in the construction of U.S. Patent 2,936,790 is accomplished primarily by axial compression of portions of the flow control member. There is thus a fundamental difference in theory of operation of the two devices. It is contemplated that the number and size of the flow apertures in the present invention structures can be varied to give various progressively changeable flow area sizes as required to suit different conditions.

Figure 4:
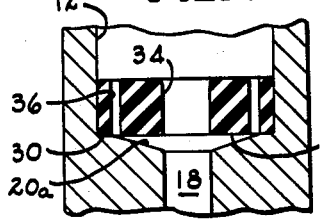
FIG. 4 is a sectional view of a second embodiment of the invention showing same when subjected to a zero fluid supply pressure.
Figure 5:
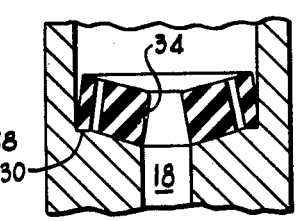
FIG. 5 is a view of the FIG. 4 embodiment showing same when subjected to an intermediate fluid supply pressure.
Figure 6:
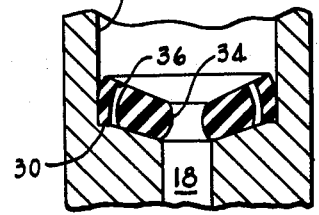
FIG. 6 is a sectional view of the FIG. 4 embodiment showing same in the condition thereof when the supplied pressure is relatively high.

A variational form of the invention is shown in FIG. 4, and since many of the component parts and surfaces thereof are similar to those in the FIG. 1 embodiment, similar reference numerals are employed wherever applicable. Structurally the FIG. 4 device is distinguished from the FIG. 1 device in that the downstream face 28 of the flow control member is flat instead of concave as in the FIG. 1 embodiment, whereas the inner annular portion 20a of the shoulder is frustro-conically concaved rather than flat as in the FIG. 1 embodiment. Both forms of the invention provide a cavity between the shoulder and flow control annulus for permitting the annulus to readily deflect between the low pressure and high pressure positions for thus enabling the primary flow aperture 34 to control the flow in the high pressure range and for permitting the auxiliary flow apertures 36 to cooperate with the primary flow aperture to control the flow in the low pressure range, as for example the area of about fifteen p.s.i. As will be seen from FIGS. 3 and 6, both forms of the invention are believed to provide for axial compression of the flow control member in the very high pressure range to thus maintain a relatively constant volumetric delivery in such range.

The forms of the invention illustrated in the drawing are susceptible to large volume low cost manufacture and without necessity for maintaining close tolerances on a plurality of different parts. Some variation in configuration of parts may be resorted to without departing from the spirit of the invention as set forth in the accompanying claims.

We claim:

1. In combination, fluid conduit means defining a relatively large diameter inlet chamber, a relatively small diameter outlet chamber, and an annular shoulder therebetween; a resilient rubber-like flow control annulus of appreciable axial thickness disposed in the inlet chamber and having a continuous outer circumferential portion seated on the outer peripheral portion of the shoulder; said shoulder and flow control annulus having flat opposing surfaces located radially inwardly from the outer peripheral portion of the shoulder, one of said surfaces lying in a radial plane and the other surface being a regular frustro-conical surface, whereby the inner portion of the annulus downstream face is spaced axially from the shoulder; said flow control annulus having at least one auxiliary flow aperture extending from its upstream face to its aforementioned flat surface at a point located adjacent its outer peripheral seating portion; said auxiliary flow aperture being separate from the central flow aperture formed by the annulus so that fluid flows in separate streams through the individual apertures.

2. In combination, fluid conduit means having an annular generally axially extending interior side surface defining an inlet chamber, a generally radially extending flat shoulder extending inwardly from said interior side surface, and an annular generally axially extending surface directed from the inner edge area of the annular shoulder to define an outlet chamber; a resilient rubber-like flow control member of appreciable axial thickness having a downstream outer peripheral face area seated against the outer portion of the annular shoulder around the entire periphery of the flow control member, said member having a regular flat frustro-conical concave inner downstream face area extending from said outer downstream face area to permit the member to deform in response to pressure on its upstream face; said flow control member having a primary flow aperture extending between its upstream and downstream faces in general axial alignment with the outlet chamber to control flow in a relatively high pressure range by deflection and deformation of the member in response to fluid pressure increase on the upstream face; said flow control member also having at least one auxiliary flow aperture extending from its upstream face a portion of the aforementioned flat concave face area located adjacent the outer peripheral face area so that in a low pressure range the deflection of the flow control member is effective to cause the flat concave face area to seat against the shoulder for thereby sealing the small flow control aperture; said auxiliary flow aperture being separate from the primary flow aperture so that fluid flows in separate streams through the individual apertures.

3. In combination, fluid conduit means having an interior axially extending annular surface of relatively large diameter defining an inlet chamber, an annular axially extending interior side surface of relatively small diameter defining an outlet chamber, and a generally radially extending shoulder interconnecting the two interior side surfaces; a resilient rubber-like flow control member of appreciable axial thickness having a downstream face thereof seated on said shoulder around the entire periphery of the flow control member; said flow control member having a relatively large primary flow control aperture extending from its upstream face to its downstream face in general axial alignment with the outlet chamber; said shoulder including a flat outer annular surface portion sealingly engaging the outer peripheral portion of the flow member downstream face and an annular regular flat frustro-conical inner surface portion extending therefrom to define a cavity between the fluid conduit means and the portion of the flow control member immediately surrounding the primary flow aperture; said flow control member having at least one auxiliary flow aperture extending from its upstream face to portions of its downstream face registering with the frustro-conical surface portion of the shoulder at a point adjacent the outer annular surface portion so that in a low fluid pressure range the inner portion of the flow control member will deflect into engagement with the concave surface portion of the shoulder, to thus seal the auxiliary flow aperture from the outlet chamber; said auxiliary flow aperture being separate from the primary flow aperture so that fluid flows in separate streams through the individual apertures.

References Cited in the file of this patent

UNITED STATES PATENTS

| | | |
|---|---|---|
| 2,454,929 | Kempton | Nov. 30, 1948 |
| 2,593,315 | Kraft | Apr. 15, 1952 |
| 2,728,355 | Dahl | Dec. 27, 1955 |
| 2,936,790 | Dahl et al. | May 17, 1960 |